W. C. BEATTIE.
Salt-Cellar and Pepper-Box.

No. 225,785.  Patented Mar. 23, 1880.

WITNESSES:
A. B. Robertson
Edw. T. W. Byrn

INVENTOR:
Wm C. Beattie
BY
ATTORNEYS.

UNITED STATES PATENT OFFICE.

WILLIAM C. BEATTIE, OF TAUNTON, MASSACHUSETTS, ASSIGNOR TO REED & BARTON, OF SAME PLACE.

SALT-CELLAR AND PEPPER-BOX.

SPECIFICATION forming part of Letters Patent No. 225,785, dated March 23, 1880.

Application filed January 23, 1880.

*To all whom it may concern:*

Be it known that I, WM. C. BEATTIE, of Taunton, in the county of Bristol and State of Massachusetts, have invented a new and Improved Salt-Cellar and Pepper-Box; and I do hereby declare that the following is a full, clear, and exact description of the same, reference being had to the accompanying drawings, forming part of this specification, in which—

Figure 1:
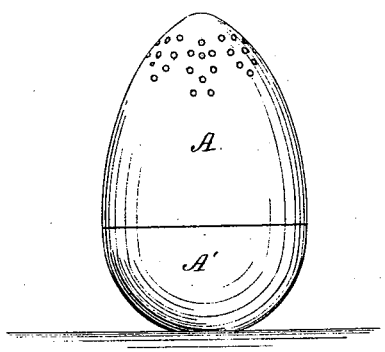
Figure 2:
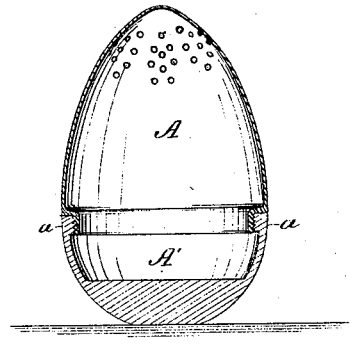
Figure 3:
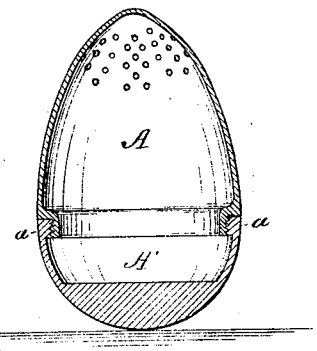

Figure 1 is a side view, and Fig. 2 a vertical section, of a salt-cellar made in the shape of an egg and both weighted and flattened at its lower end. Fig. 3 is a vertical section of a salt-cellar made in egg shape and weighted at its lower end without being flattened.

This invention relates to a novel construction of salt-cellar or pepper or spice box; and it consists in an oval-bottomed metal box divided transversely and having its sections connected detachably with a screw-thread, and having also one end perforated with holes through which the salt or pepper can be sifted, and the other end weighted or slightly flattened, or both, so as to cause the box to set upright, as hereinafter described.

In the drawings, A A' represent the two sections of the salt-cellar or pepper-box, which are connected detachably by a screw-thread, *a*, which latter permits the two sections to be taken apart when the salt or pepper is to be inserted. These two sections are preferably formed with smooth prolate hemispherical surfaces, so that when placed together they present the contour of an egg. The upper section, representing the smaller end of the egg, is perforated about its apex with holes, through which the salt or pepper is sifted as it is used, while the lower end is made heavier or weighted, so as to cause the egg to stand upright on the table. The lower section may be also slightly flattened, so as to give a base upon which the article can stand when not in use. The box, however, is weighted at its lower end with or without being flattened. The box as thus constructed is preferably made of white metal or nickel-silver and silver-plated; but it may be made of other material.

I do not confine myself to the egg shape, but any desirable form can be used provided it is loaded or self-righting.

Having thus described my invention, what I claim as new is—

1. A salt-cellar or pepper-box made in two sections with a rounded lower end, and with the upper part perforated and the lower part weighted, so as to cause it to be self-righting.

2. A salt-cellar or pepper-box made in the shape of an egg of two separable parts, with the smaller end perforated with holes and the larger end weighted to maintain the upright position.

3. A salt-cellar or pepper-box made in the shape of an egg of two separable parts, having one part flattened for a base and the other part perforated with holes, substantially as and for the purpose described.

WILLIAM CHALLEN BEATTIE.

Witnesses:
F. E. FISKE,
THEO. P. HALL.